United States Patent
Cheon et al.

(10) Patent No.: US 12,476,945 B2
(45) Date of Patent: Nov. 18, 2025

(54) ELECTRONIC DEVICE FOR PERFORMING EVALUATION OF ENCRYPTED MESSAGES AND METHODS THEREOF

(71) Applicant: CRYPTO LAB INC., Seoul (KR)

(72) Inventors: Jung Hee Cheon, Seoul (KR); Taekyung Kim, Seoul (KR); Yongdong Yeo, Seoul (KR); Jeongdae Hong, Seoul (KR)

(73) Assignee: CRYPTO LAB INC., Seoul (KR)

( * ) Notice: Subject to any disclaimer, the term of this patent is extended or adjusted under 35 U.S.C. 154(b) by 110 days.

(21) Appl. No.: 18/398,434

(22) Filed: Dec. 28, 2023

(65) Prior Publication Data

US 2024/0223541 A1    Jul. 4, 2024

(30) Foreign Application Priority Data

Dec. 28, 2022  (KR) .......................... 10-2022-0187961
Dec. 26, 2023  (KR) .......................... 10-2023-0191303

(51) Int. Cl.
*H04L 9/40*    (2022.01)
*H04L 9/08*    (2006.01)

(52) U.S. Cl.
CPC ........ *H04L 63/0428* (2013.01); *H04L 9/0866* (2013.01); *H04L 9/0891* (2013.01)

(58) Field of Classification Search
CPC . H04L 63/0428; H04L 9/0866; H04L 9/0891; H04L 63/0435
See application file for complete search history.

(56) References Cited

U.S. PATENT DOCUMENTS

| | | | |
|---|---|---|---|
| 11,450,238 B2* | 9/2022 | Nishimaki | H04L 9/0618 |
| 2015/0358153 A1* | 12/2015 | Gentry | H04L 9/3093 380/30 |
| 2019/0012469 A1* | 1/2019 | Naganuma | G06F 21/6227 |
| 2023/0291573 A1* | 9/2023 | Cheon | H04L 9/3247 |
| 2024/0048377 A1* | 2/2024 | Kawai | H04L 9/0637 |
| 2024/0405969 A1* | 12/2024 | Kim | H04L 9/0618 |
| 2024/0421976 A1* | 12/2024 | Kawai | H04L 9/0894 |
| 2025/0023715 A1* | 1/2025 | Bae | H04L 9/0618 |
| 2025/0158808 A1* | 5/2025 | Zeh | H04L 9/0827 |

* cited by examiner

*Primary Examiner* — Michael R Vaughan
(74) *Attorney, Agent, or Firm* — Steinfl + Bruno LLP

(57) ABSTRACT

The electronic device includes: a communicator communicating with a plurality of external devices each generating an encryption key; a memory; and a processor, wherein the processor stores a plurality of encrypted messages in the memory when receiving the plurality of encrypted messages each encrypted with the encryption key by the plurality of external devices through the communicator, performs a key switching operation using a switching key for the plurality of encrypted messages to change each of the plurality of encrypted messages to the encrypted message encrypted with a common key, and evaluates the changed plurality of encrypted messages by using at least one evaluation key.

6 Claims, 16 Drawing Sheets

FIG. 7

---
Algorithm : PubKeyGen(X, a, sk$_i$, x)

---
Public input: a ∈ R$_X$ (common reference string)
Private input: s$_i$ = sk$_i$ ← χ$_{sk}$
e$_i$ ← χ$_{err}$
b = -as$_i$ + x + e$_i$
return b

---
Algorithm : RelinKeyGen($a, b, sk_i, rsk_i$)

---
Public input: $a, b \in R_{PQ_L}$(common reference string)
Private input: $s_i = sk_i$, $r_i = rsk_i \leftarrow \chi_{sk}$
$e_{0,i}, e_{1,i}, e_{2,i} \leftarrow \chi_{err}$
$rlk_{0,i} = -as_i + e_{0,i}$ and
$rlk_{1,i} = -ar_i + Ps_i + e_{1,i}$
$rlk_{2,i} = -bs_i - Pr_i + e_{2,i}$
return $rlk_i = (rlk_{0,i}, rlk_{1,i}, rlk_{2,i})$

---
Algorithm : SWKeyGen($sk_i$, pk)

---
Public input: pk
Private input: $s_i = sk_i \leftarrow \chi_{sk}$
$e_{0,i}, e_{1,i} \leftarrow \chi_{err}$
$swk_{0,i} = pk_0 \cdot r + e_{0,i}$
$swk_{1,i} = pk_1 \cdot r + P_{s_i} + e_{1,i}$
return $swk_i = (swk_{0,i}, swk_{1,i})$

$pk_{n+1} \leftarrow \text{PubKeyGen}(PQ_L, pk_0, sk_{n+1}, 0)$ $rotkey_{n+1} \leftarrow \text{PubKeyGen}(PQ_L, rotkey_0, sk_{n+1}, P \cdot sk^\sigma_{n+1})$ $rlk_{n+1} \leftarrow \text{RelinKeyGen}(a, b, sk_{n+1}, rsk_{n+1})$ $pk' \leftarrow pk + pk_{n+1}$ $swk_{n+1} \leftarrow \text{SWKeyGen}(sk_{n+1}, pk)$ $jswk_{n+1} \leftarrow \text{JSWKeyGen}(sk_{n+1}, swk_0 = \sum_{i \in [n]} swk_{0,i})$

FIG. 11

---
Algorithm : JSWKeyGen($sk_i$, $swk_0 = \sum swk_{0,i}$)

---
Public input: $swk_0 = \sum swk_{0,i}$
Private input: $s_i = sk_i$
$e_i \leftarrow \chi_{err}$
$jswk_{0,i} = 0$
$jswk_{1,i} = -swk_0 \cdot s_i + e_i$
return $jswk_i = (jswk_{0,i}, jswk_{1,i})$

$$jswk \leftarrow \sum_{i \in [n]} swk_i + jswk_{n+1}$$
$$ct_{n+1,j} \leftarrow KS_{swk_{n+1}}(ct_{n+1,j}), \forall j \in [m_{n+1}]$$
$$ct_k \leftarrow KS_{jswk}(ct_k), \forall k \in [\ell]$$
$$swk_i \leftarrow KS_{jswk}(swk_i), \forall i \in [n]$$
$$swk \leftarrow KS_{jswk}(swk)$$
$$rotkey \leftarrow rotkey + rotkey_{n+1}$$
$$rlk \leftarrow rlk + rlk_{n+1}$$
$$swk \leftarrow swk + swk_{n+1}$$

FIG. 13

$$jswk = \sum_{i \in [n]} swk_i + jswk_{n+1}$$
$$= (\sum_{i \in [n]} swk_{0,i}, -sk \cdot \sum_{i \in [n]} swk_{0,i} + P \cdot sk + e_{swk}) + (0, -sk_{n+1} \cdot \sum_{i \in [n]} swk_{0,i} + e_{n+1})$$
$$= (\sum_{i \in [n]} swk_{0,i}, -(sk + sk_{n+1}) \cdot \sum_{i \in [n]} swk_{0,i} + P \cdot sk + e_{swk} + e_{n+1})$$
$$= Enc_{sk+sk_{n+1}}(P \cdot sk)$$

$$lswk_n \leftarrow \text{LSWKeyGen}(sk_n, swk_0 = \sum_{i \in [n]} swk_{0,i})$$

$$lswk \leftarrow \sum_{i \in [n]} swk_i - lswk_n$$
$$ct_k \leftarrow KS_{lswk}(ct_k), \forall k \in [\ell]$$
$$swk_i \leftarrow KS_{lswk}(swk_i), \forall i \in [n-1]$$
$$pk \leftarrow pk - pk_n$$
$$rotkey \leftarrow rotkey - rotkey_n$$
$$rlk \leftarrow rlk - rlk_n$$
$$swk \leftarrow swk - swk_n$$

ELECTRONIC DEVICE FOR PERFORMING EVALUATION OF ENCRYPTED MESSAGES AND METHODS THEREOF

BACKGROUND

Field

This disclosure is related to an electronic device for performing evaluation of encrypted messages and methods thereof.

Description of the Related Art

In accordance with the development of communication technology and the growing spread of electronic devices, efforts are continuously being made to maintain communication security between the electronic devices. Accordingly, encryption/decryption technology may be used in most communication environments.

When a message encrypted by the encryption technology is delivered to the other party, the other party may be required to perform decryption in order to use the message. In this case, the other party may waste resources and time in a process of decrypting the encrypted data. In addition, hacking may occur by a third party while the other party temporarily decrypts the message for evaluation. In this case, the message may easily be leaked to a third party.

A homomorphic encryption method is being studied to solve this problem. The homomorphic encryption method may acquire the same result as an encrypted value acquired after evaluating a plaintext even when evaluating the encrypted message itself without decrypting encrypted information. Therefore, various evaluations may be performed without decrypting the encrypted message.

However, when a plurality of devices generate and encrypt their own keys, the keys used for the encryption may be different from each other. Therefore, it is impossible to evaluate the encrypted messages together. It may thus be difficult to use the homomorphic encryption when the data from the various devices are required to be collected and processed.

Therefore, there is an emerging need for technology for evaluating the data encrypted using the respective keys of the plurality of devices.

SUMMARY

The disclosure provides an electronic device for performing evaluation of messages respectively encrypted by various devices and an evaluation method thereof.

According to at least one embodiment of the disclosure, provided is an electronic device including a communicator communicating with a plurality of external devices each generating an encryption key, a memory, and a processor.

The processor may store a plurality of encrypted messages in the memory when receiving the plurality of encrypted messages each encrypted with the encryption key by the plurality of external devices through the communicator, perform a key switching operation using a switching key for the plurality of encrypted messages to change each of the plurality of encrypted messages to the encrypted message encrypted with a common key, evaluate the changed plurality of encrypted messages by using at least one evaluation key, and control the communicator to transmit an evaluation result to at least one of the plurality of external devices.

The processor may receive an individual switching key, an individual relinear key, and an individual rotation key, generated by each of the plurality of external devices through the communicator, and add the respective individual switching keys, individual relinear keys, and individual rotation keys to acquire the switching key, a relinear key, and a rotation key, and the at least one evaluation key may include the relinear key or the rotation key.

When a new external device is added and a new encryption key, the individual switching key, an additional individual switching key (or joining separate switching key) and a newly encrypted message, generated by the new external device, are received through the communicator, the processor may modify the switching key to an additional switching key (or joining switching key (jswk)) based on the individual switching key and the additional individual switching key respectively corresponding to the plurality of external devices, perform the key switching operation using the additional switching key for the changed plurality of encrypted messages and the newly encrypted message to re-change each of the changed plurality of encrypted messages to the encrypted message encrypted with a new common key reflecting the new encryption key, perform the evaluation for the re-changed plurality of encrypted messages by using a new evaluation key modified to reflect the new evaluation key generated by the new external device, and control the communicator to transmit the evaluation result to at least one of the plurality of external devices including the new external device.

When at least one of the plurality of external devices is separated, the processor may modify the switching key to a separation switching key (or leaving separate switching key (lswk)) based on a separation individual switching key (or leaving separate switching key) of the separated external device, perform the key switching operation using the separation switching key for the changed plurality of encrypted messages to re-change each of the changed plurality of encrypted messages to the encrypted message encrypted with a new common key except for the encryption key of the separated external device, perform the evaluation for the re-changed plurality of encrypted messages by using a new evaluation key modified to reflect the separation of the external device, and control the communicator to transmit the evaluation result to at least one of the other external devices except for the separated external device.

According to at least one embodiment of the disclosure, provided is an evaluation method of an electronic device, the method including: receiving and storing a plurality of encrypted messages each encrypted with an encryption key by a plurality of external devices each generating the encryption key; performing a key switching operation using a switching key for the plurality of encrypted messages to change each of the plurality of encrypted messages to the encrypted message encrypted with a common key; evaluating the changed plurality of encrypted messages by using at least one evaluation key; and transmitting an evaluation result to at least one of the plurality of external devices.

The method may further include: receiving and storing an individual switching key, an individual relinear key, and an individual rotation key, generated by each of the plurality of external devices; and adding the respective individual switching keys, individual relinear keys, and individual rotation keys to acquire the switching key, a relinear key, and a rotation key, wherein the at least one evaluation key includes the relinear key or the rotation key.

The method may further include: when a new external device is added and a new encryption key, the individual switching key, an additional individual switching key (or joining separate switching key) and a newly encrypted message, generated by the new external device, are received, modifying the switching key to an additional switching key (or joining switching key (jswk)) based on the individual switching key and the additional individual switching key respectively corresponding to the plurality of external devices; performing the key switching operation using the additional switching key for the changed plurality of encrypted messages and the newly encrypted message to re-change each of the changed plurality of encrypted messages to the encrypted message encrypted with a new common key reflecting the new encryption key; performing the evaluation for the re-changed plurality of encrypted messages by using a new evaluation key modified to reflect the new evaluation key generated by the new external device; and transmitting the evaluation result to at least one of the plurality of external devices including the new external device.

The method may further include: when at least one of the plurality of external devices is separated, modifying the switching key to a separation switching key (or leaving separate switching key (lswk)) based on a separation individual switching key (or leaving separate switching key) of the separated external device; performing the key switching operation using the separation switching key for the changed plurality of encrypted messages to re-change each of the changed plurality of encrypted messages to the encrypted message encrypted with a new common key except for the encryption key of the separated external device; performing the evaluation for the re-changed plurality of encrypted messages by using a new evaluation key modified to reflect the separation of the external device; and transmitting the evaluation result to at least one of the other external devices except for the separated external device.

According to the various embodiments of the disclosure as described above, the electronic device may effectively process the evaluation of the encrypted messages generated by the plurality of external devices by using the individually generated encryption keys. Accordingly, the electronic device may acquire the various evaluation results while maintaining the security.

BRIEF DESCRIPTION OF THE DRAWINGS

FIGS. 7 and 8 are views for explaining a method of generating an encryption key and an evaluation key by the external device.

FIG. 9 is a view showing an example of an algorithm for generating a switching key.

FIG. 10 is a view for explaining an operation of a new external device that is newly added.

FIG. 11 shows an example of an algorithm for generating an additional switching key.

FIG. 12 is a view for explaining an operation of a server device when the new external device is added.

FIG. 13 is a view for explaining a method of generating the additional switching key.

FIG. 14 is a view for explaining an operation of the separated external device when one of the existing external devices is separated.

FIG. 15 is a view for explaining an operation of the electronic device when one of the existing external devices is separated.

DETAILED DESCRIPTION

Figure 1:
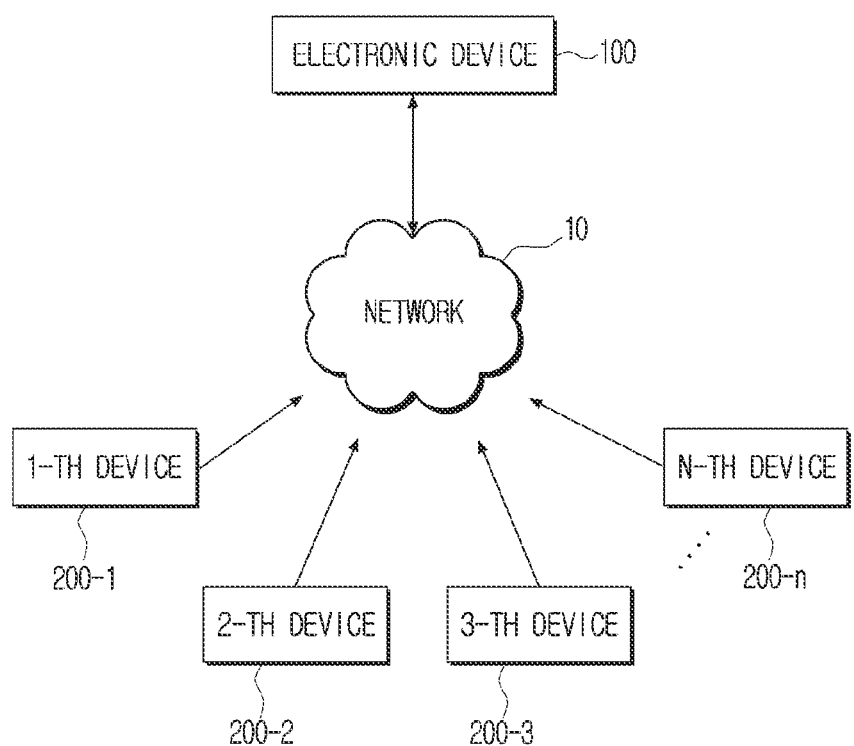
FIG. 1 is a view for explaining an operation of an electronic device according to at least one embodiment of the disclosure.

Hereinafter, the disclosure will be described in detail with reference to the accompanying drawings. Encryption/decryption may be applied as necessary to a process of transmitting data (or information) that is performed in the disclosure, and an expression describing the process of transmitting the data (or information) in the disclosure and the claims should be interpreted as including cases of the encryption/decryption even if not separately mentioned. In the disclosure, an expression such as "transmission/transfer from A to B" or "reception from A to B" may include transmission/transfer or reception while having another medium included in the middle, and may not necessarily express only the direct transmission/transfer or reception from A to B.

In describing the disclosure, a sequence of each operation should be understood as non-restrictive unless a preceding operation in the sequence of each operation needs to logically and temporally precede a subsequent operation. That is, except for the above exceptional case, the essence of the disclosure is not affected even though a process described as the subsequent operation is performed before a process described as the preceding operation, and the scope of the disclosure should also be defined regardless of the sequence of the operations. In addition, in the specification, "A or B" may be defined to indicate not only selectively indicating either one of A and B, but also including both A and B. In addition, a term "including" in the disclosure may have a meaning encompassing further including other components in addition to components listed as being included.

The disclosure only describes essential components necessary for describing the disclosure, and does not mention components unrelated to the essence of the disclosure. In addition, it should not be interpreted as an exclusive meaning that the disclosure includes only the mentioned components, but should be interpreted as a non-exclusive meaning that the disclosure may include other components as well.

In addition, in the disclosure, a "value" may be defined as a concept that includes a vector or a polynomial form as well as a scalar value.

Mathematical evaluation and calculation of each step in the disclosure described below may be implemented as computer evaluation by a known coding method or coding designed to be suitable for the disclosure to perform the corresponding evaluation or calculation.

Specific equations described below are exemplarily described among possible alternatives, and the scope of the disclosure should not be construed as being limited to the equations mentioned in the disclosure.

For convenience of description, the disclosure defines the following notations:

a←D: Select an element a according to distribution D.

s1, s2∈R: Each of S1 and S2 is an element belonging to a set R.

mod(q): Perform modular evaluation with an element q.

⌊·⌉: Round an internal value.

Hereinafter, various embodiments of the disclosure are described in detail with reference to the accompanying drawings.

FIG. 1 is a view for explaining an operation of an electronic device according to at least one embodiment of the disclosure. According to FIG. 1, an electronic device 100 may communicate with various devices 200-1-th to 200-n-th through a network 10.

For convenience of explanation, hereinafter, the devices 200-1-th to 200-n-th connected to the server device 100 are collectively referred to as external devices, and the respective external devices 200-1-th to 200-n-th may be implemented as various types of electronic devices each equipped with a communication function.

The electronic device 100 may be implemented in any of various forms such as the server device, a personal computer (PC), a laptop PC, a mobile phone, a tablet PC, or a kiosk. When implemented as the server device, the electronic device 100 may be implemented as any of various computing devices such as a workstation, a cloud, a data drive, or a data station.

The network 10 may include both of a wired network and a wireless network. The wired network may include a cable network, a telephone network, or the like, and the wireless network may include any network for transmitting and receiving a signal through a radio wave. The wired network and the wireless network may be connected to each other.

Each of the external devices 200-1-th to 200-n-th may generate an encryption key. The encryption key may include a secret key and a public key. The respective external devices 200-1-th to 200-n-th may encrypt various messages by using the generated encryption key and transmit the encrypted message to the electronic device 100 through the network 10. In the disclosure, the message may include various information or data to be transmitted, the encryption may be homomorphic encryption, and the encrypted message may be a homomorphically encrypted message.

Each of the external devices 200-1-th to 200-n-th may include, in the encrypted message, encryption noise, that is, an error calculated in a process of performing the homomorphic encryption. In detail, the homomorphically encrypted message generated by each of the external devices 200-1-th to 200-n-th may be generated in a form in which a result value including the message and an error value is restored when decrypted using the secret key later.

As an example, the homomorphically encrypted message generated by each of the external devices 200-1-th to 200-n-th may be generated in a form in which the following property are satisfied when decrypted later using the secret key.

$$Dec(ct, sk) = <ct, sk> = M + e(\text{mod } q) \qquad [\text{Equation 1}]$$

Here, <, > indicates internal evaluation (usual inner product), ct means the encrypted message, sk means the secret key, M indicates a plaintext message, e indicates the encryption the error value, and mod q indicates a modulus of the encrypted message. q needs to be chosen larger than the result value M multiplied by a scaling factor Δ to the message. In a case where an absolute value of the error value e is sufficiently smaller than M, a decryption value M+e of the encrypted message may be a value that may replace an original message by the same precision in significant figure calculation. Among decrypted data, the error may be disposed on the least significant bit (LSB) side, and M may be disposed on the next least significant bit side.

When a size of the message is too small or too large, the size may be adjusted using the scaling factor. When using the scaling factor, not only a message in an integer form but also a message in a real number form may be encrypted, and its usability may thus be greatly increased. In addition, the size of the message may be adjusted using the scaling factor to thus also adjust a size of a region where the messages exist, i.e., effective region in the encrypted message after the evaluation is performed.

In some embodiments, the modulus q of the encrypted message may be set and used in various forms. As an example, the modulus of the encrypted message may be set in a form of an exponential power $q=\Delta^L$ of the scaling factor Δ. When Δ is 2, the modulus may be set to a value such as $q=2^{10}$.

In addition, the homomorphically encrypted message according to the disclosure is described assuming that a fixed point is used. However, the homomorphically encrypted message may also be applied even when using a floating point.

Each of the external devices 200-1-th to 200-n-th may directly store the generated encrypted message or provide the same to the electronic device 100.

When the respective external devices 200-1-th to 200-n-th directly generate the encryption keys used for the encryption, the encryption keys may be different from each other. When the encryption keys used for the encryption are different from each other, it is impossible to evaluate the encrypted messages received from the respective external devices 200-1-th to 200-n-th according to the prior art.

According to the disclosure, the electronic device 100 may switch each encrypted message by performing a key switching operation of switching the encryption key used in each encrypted message to a switching key (swk.) The encrypted message switched by the key switching operation may be encrypted with a common key, that is, the switching key. Accordingly, the electronic device 100 may perform the evaluation for the plurality of changed encrypted messages. The electronic device 100 may transmit an evaluation result to each of the external devices 200-1-th to 200-n-th, at least one of all the external devices 200-1-th to 200-n-th, or another external device. Alternatively, the electronic device 100 may manage the evaluation result by storing the result in an internal memory without separately transmitting the result.

When the results evaluated by the electronic device 100 are transmitted to the respective external devices 200-1-th to 200-n-th, each of the external devices 200-1-th to 200-n-th may decrypt the evaluation result by using the secret key among the encryption keys generated by the device itself. The evaluation may be performed in an encryption state, the evaluation result may thus also have a form of the encrypted message, thus requiring all the decryption to check all the evaluation results. However, each of the external devices 200-1-th to 200-n-th may only have the encryption key partially used for the encryption. Therefore, each of external devices 200-1-th to 200-n-th is unable to perform all the decryption to check all the evaluation results, and perform partial decryption using its secret key.

All the evaluation results may be checked when combining the evaluation results partially decrypted from the respective external devices 200-1-th to 200-n-th. Among the respective external devices 200-1-th to 200-n-th, at least one external device or other device determined by prior agreement or the like may have authority to check all the evaluation results. In this case, each of the external devices 200-1-th to 200-n-th may transmit result data of the partial decryption to the corresponding device. Accordingly, security of all the evaluation results and each message or the like used therein may be thoroughly maintained except for the device with the check authority.

Meanwhile, in an embodiment described above, it is possible to secure the evaluation results of the encrypted messages transmitted from the plurality of external devices 200-1-th to 200-n-th. In this case, a new external device may be added to the plurality of external devices 200-1-th to 200-n-th, or one of the existing external devices may be separated.

When the new external device is added, the electronic device 100 may generate a new switching key by using the encryption key and the encrypted message that are newly generated by the new external device, re-perform the key switching operation for the existing encrypted messages by using the new switching key, and immediately perform the evaluation reflecting even the encrypted message of the new external device.

On the other hand, even when at least one of the existing external devices is separated, the electronic device 100 may generate a new switching key by using the encryption key or the like of the separated external device, and use the new switching key to re-perform the key switching operation for the encrypted message of the other external devices.

Accordingly, even when the device is added to or separated from the existing devices, the electronic device 100 may quickly reflect a change and perform the accurate evaluation without any need to receive new data from all the external devices. That is, it is possible to minimize burdens of the evaluation and the communication by greatly increasing dynamism in the evaluation of the homomorphically encrypted message and its processing process.

Figure 2:
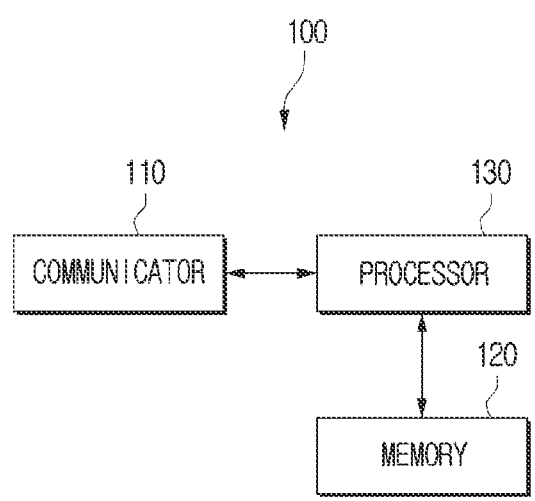
FIG. 2 is a block diagram showing a configuration of an electronic device according to at least one embodiment of the disclosure.

FIG. 2 is a block diagram showing a configuration of the electronic device according to at least one embodiment of the disclosure. Referring to FIG. 2, the electronic device 100 may include a communicator 110, a memory 120, and a processor 130.

The communicator 110 may include at least one wireless communication module, at least one wired communication module, or the like. Each communication module may be implemented in a form of at least one hardware chip. For example, the wireless communication module may include at least one of a wireless-fidelity (Wi-Fi) module, a Bluetooth module, an infrared communication module, or other communication modules. In addition, the communicator 110 may include at least one communication chip performing the communication based on various wireless communication standards such as zigbee, third generation (3G), third generation partnership project (3GPP), long term evolution (LTE), LTE advanced (LTE-A), fourth generation (4G) and fifth generation (5G). The wired communication module may include at least one of a local area network (LAN) module, an Ethernet module, a pair cable, a coaxial cable, an optical fiber cable, or an ultra wide-band (UWB) module.

In addition, the communicator 110 may further include at least one of a wired input/output interface of a high definition multimedia interface (HDMI), a mobile high-definition link (MHL), a universal serial bus (USB), a USB C-type, a display port (DP), a thunderbolt, a video graphics array (VGA) port, a red-green-blue (RGB) port, a D-subminiature (D-SUB) or a digital visual interface (DVI).

The communicator 110 may receive the data on or the signal of the various keys or encrypted messages from the various devices 200-1-th to 200-n-th connected thereto as shown in FIG. 1.

The memory 120 is a component for storing or recording various information, data, instructions, programs, or the like, required for the operation of the electronic device 100.

The memory 120 may be implemented as at least one of various memories such as a volatile memory (for example, a dynamic random access memory (DRAM), a static RAM (SRAM), or a synchronous dynamic RAM (SDRAM)) and a non-volatile memory (for example, an one time programmable read only memory (OTPROM), a programmable ROM (PROM), an erasable and programmable ROM (EPROM), an electrically erasable and programmable ROM (EEPROM), a mask ROM, or a flash ROM, a flash memory (for example, a NAND flash or a NOR flash), a hard drive, or a solid state drive (SSD)).

FIG. 2 shows one memory 120. However, the memory 120 may be implemented to include a plurality of the memories each storing different types of data or data generated at different stages, and at least one of these memories may be implemented as a single chip integrated with the processor 130.

The memory 120 may store various data and signals received from each external device through the communicator 110. In detail, the memory 120 may store the encrypted message or the like encrypted by each external device.

In addition, the memory 120 may store at least one evaluation key used for the evaluation of the encrypted message, various basic data, software, and the like required for the evaluation. In detail, the memory 120 may store various software modules such as a key generation module generating the switching key, a key switching module performing the key switching operation, an evaluation module performing the evaluation, another encrypted message processing module, and the like.

The processor 130 may perform various operations based on the various data, signals, software, or the like, stored in the memory 120. The processor 130 may be implemented as a digital signal processor (DSP), a micro processor (microprocessor), a graphics processing unit (GPU), an artificial intelligence (AI) processor, a neural processing unit (NPU), or the like. However, the processor 120 is not limited thereto, and may include one or more of a central processing unit (CPU), a micro controller unit (MCU), a controller, an application processor (AP), a communication processor (CP), or an advanced RISC machine (ARM) processor, or may be defined by these terms. In addition, the processor 130 may be implemented in a system-on-chip (SoC) or a large scale integration (LSI) in which a processing algorithm is embedded, or may be implemented in a form of an application specific integrated circuit (ASIC) or a field programmable gate array (FPGA).

When each of the plurality of external devices 200-1-th to 200-n-th generates the encryption key and transmits the encrypted message based on the encryption key, the processor 130 may receive each encrypted message acquired by the encryption through the communicator 110. The processor 130 may store the plurality of received encrypted messages in the memory 120. The encrypted messages may be frequently or periodically transmitted. In addition, the encrypted message transmitted by one external device is not limited to one message, and the plurality of encrypted messages may be simultaneously or sequentially transmitted. The processor 130 may store the received encrypted messages in the memory 120 until a condition for performing the evaluation is satisfied. The condition for performing the evaluation may include conditions that a user of the electronic device 100 inputs an evaluation performance command, at least one of the plurality of external devices 200-1-th to 200-n-th or another device transmits an evaluation performance instruction, or a predetermined time period arrives (for example, a condition that the last day of each month arrives), or the like. An example of the condition is not limited thereto, and various other conditions may be predetermined.

The processor 130 may perform the key switching operation for the plurality of encrypted messages to perform the evaluation of the encrypted messages, and change each of the plurality of encrypted messages to the encrypted message encrypted with the switching key. The processor 130 may evaluate the changed plurality of encrypted messages by using at least one evaluation key. The processor 130 may store the evaluation result in the memory 120 or transmit the same to at least one of the plurality of external devices through the communicator 110. The key switching indicates a homomorphic operation enabling the message to be encrypted under a different secret key. The switching key may be required for the key switching.

When the encrypted message ct ($ct_0$, $ct_1$) and the switching key swk=($swk_0$, $swk_1$), the key switching may be expressed as the following equation:

$$([\lfloor P^{-1} \cdot ct_0 \cdot swk_0 \rfloor, -ct_1 + \lfloor P^{-1} \cdot ct_0 \cdot swk_1 \rfloor]). \quad \text{[Equation 2]}$$

For example, when the encryption key used in the encrypted message is to be changed from $sk_1$ to $sk_2$, switching key swk=$Enc_{sk2}(P \cdot sk_1)$. P may be any constant.

Figure 3:
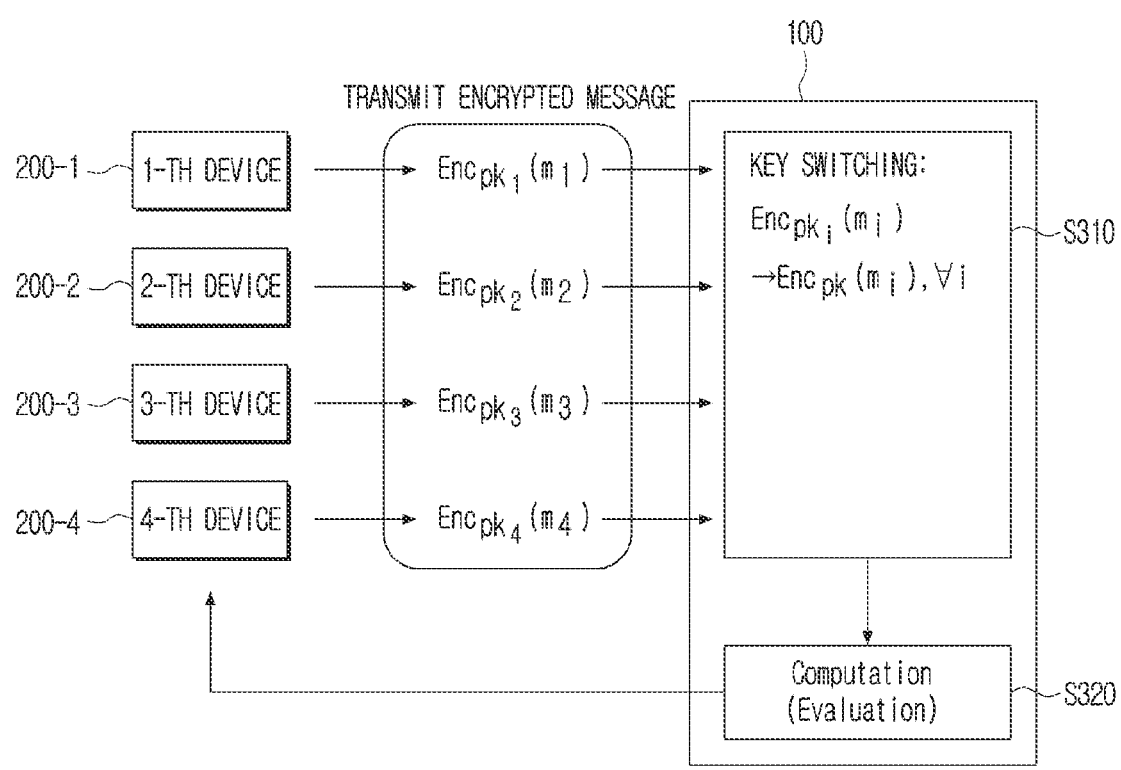
FIG. 3 is a view for explaining an operation of an electronic device that receives encrypted messages from four external devices and evaluates the same.

FIG. 3 is a view for explaining an operation of the electronic device 100 when four external devices participate among the plurality of external devices 200-1-th to 200-n-th.

Referring to FIG. 3, the respective external devices 200-1-th to 200-4-th may transmit the encrypted messages $ENC_{pk1}(m_1)$, $ENC_{pk2}(m_2)$, $ENC_{pk3}(m_3)$, and $ENC_{pk4}(m_4)$ that are generated using the respective encryption keys. Here, pk1, pk2, pk3, and pk4 indicate the public keys generated by the respective external devices 200-1-th to 200-4-th, and $m_1$, $m_2$, $m_3$, and $m_4$ indicate the messages of the respective external devices 200-1-th to 200-4-th. FIG. 3 shows the case where one device transmits only one encrypted message. However, as described above, one device may sequentially or simultaneously transmit the plurality of encrypted messages. The processor 130 of the electronic device 100 may perform the key switching for each received encrypted message. As shown in FIG. 3, i indicates an identifier for distinguishing the respective external devices 200-1-th to 200-4-th from each other, and may be any of 1 to 4. The common key pk may be a key for combining the public keys pk1, pk2, pk3, and pk4 generated by the respective external devices. Referring to FIG. 3, it may be seen that the key of the encrypted message of each external device is switched to the common key (S310).

That is, the processor 130 may perform the key switching operation using the switching key for the plurality of received encrypted messages, and change each of the plurality of encrypted messages to the encrypted message encrypted with the common key.

The processor 130 may receive the individual switching key generated by each of the plurality of external devices through the communicator 110 to acquire the switching key.

The individual switching key may be expressed in the following form:

$$swk_i = Encpk(P \cdot sk_1) \quad \text{[Equation 3]}$$

Equation 3 expresses an individual switching key of an i-th external device.

$$\text{switching key } swk = \sum Enc_{pk}(P \cdot sk_i).$$

The processor 130 may perform the evaluation (or computation) (S320) for the encrypted message switched by the key switching operation. For the evaluation, the processor 130 may use at least one evaluation key. In detail, the evaluation key may include a relinear key rlk, a rotation key rotKey, or the like. The relinear key may be used for multiplication evaluation, and the rotation key may be used for rotation evaluation.

The processor 130 may receive an individual relinear key and an individual rotation key by each external device through the communicator 110, and adding the received respective individual relinear keys and individual rotation keys to acquire the relinear key and the rotation key.

In detail, the processor 130 may acquire the common key pk, the relinear key rlk, the rotation key rotKey, the switching key swk, or the like, respectively, based on the following equation:

$$pk = (pk_0, \sum PK_i) = (pk_0, -pk_0 \cdot sk + e_{pk}) \quad \text{[Equation 4]}$$

$$rotKey =$$

$$(rotKey_0, \sum rotKey_i) = (rotKey_0, -rotKey_0 \cdot sk + P \cdot sk^\tau + erotKey)$$

$$rlk = (\sum rlk_{0,i}, \sum rlk_{1,i} \sum rlk_{2,i}) =$$

$$(-a \cdot sk + e_{rlk,0}, -a \cdot rsk + P \cdot sk + e_{rlk,1}, -b \cdot sk - P \cdot rsk + e_{rlk,2})$$

$$swk = \sum swk_i.$$

In Equation 4, sk indicates the secret key, and rsk (relinearization secret key) indicates another secret key necessary for relinearization (an element necessary for the homomorphic password multiplication) used in homomorphic password multiplication. Unlike sk, rsk may be only used in relation to the relinearization, and may not be used as the encryption key.

In Equation 4, a or b indicate a common polynomial acquired from common reference string (CRS) assumption. Each external device may share a and b in Equation 4. In addition, $pk_0$, $rotkey_0$, and $swk_0$ respectively indicate a first component among ordered pairs of pk, rotkey, and $swk_i$, which may also be the common polynomials shared by each external device.

In Equation 4, σ (sigma) indicates permutation used for generating the rotation key in an existing homomorphic encryption algorithm (e.g., a Cheon-Kim-Kim-Song (CKKS) scheme). For example, a variable X in a polynomial may be replaced by X^(5^k). Here, k indicates an arbitrary natural number representing an amount of rotation. $sk^\sigma$ may be replaced by sk(X^(5^k)) when considering that sk in Equation 4 is also a polynomial sk(X) with X as the variable.

Another key generation method is described in detail below.

The processor 130 may provide the evaluation result to at least one of the plurality of external devices 200-1-th to 200-4-th, or transmit the same to another external device. Alternatively, the processor 130 may store the evaluation result in the memory 120.

Meanwhile, as described above, the external devices may be frequently separated or added. According to various embodiments of the disclosure, the processor 130 may easily cope with such state changes.

Figure 4:
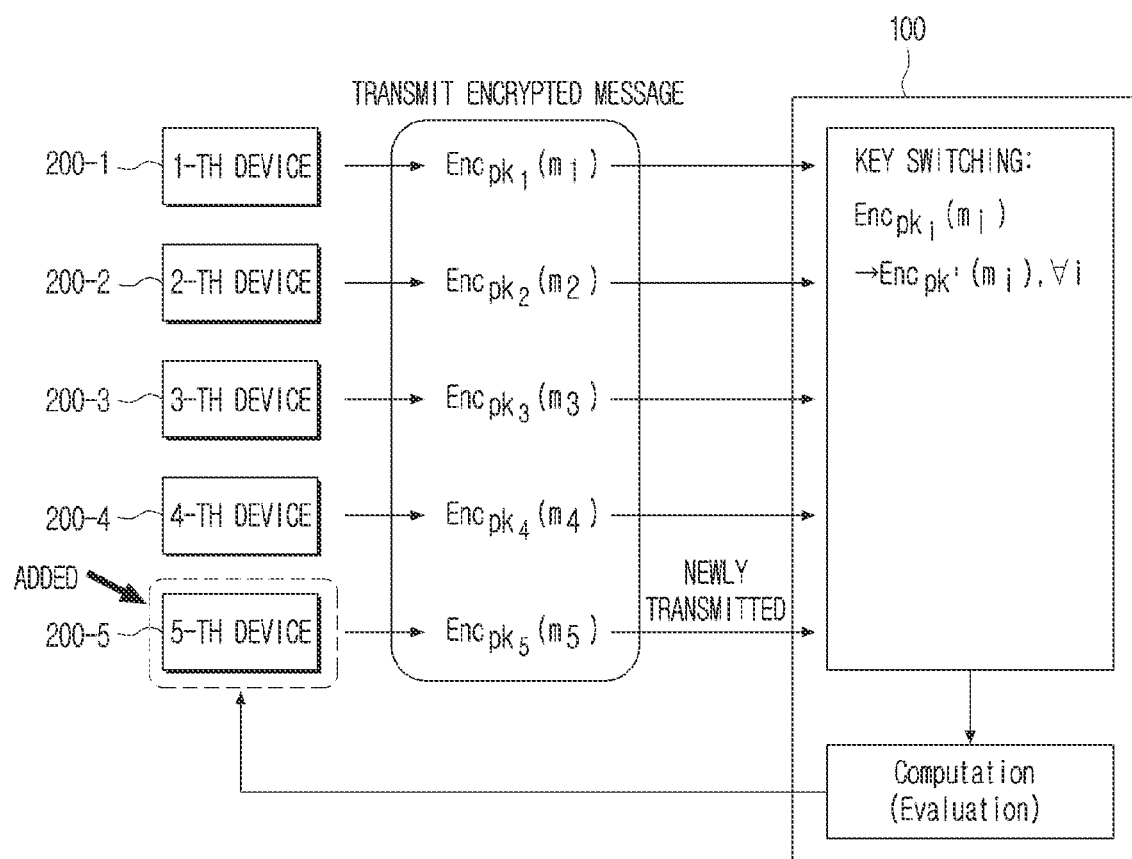
FIG. 4 is a view for explaining an operation of an electronic device when the external device is added.

FIG. 4 shows a case where a new external device is added in the environment of FIG. 3. For convenience of explanation, the connected external devices before the addition are referred to as the existing external devices 200-1-th to 200-4-th, and the newly added external device is referred to as the new external device 200-5-th. In the disclosure, the addition of a device may refer to a state such as new connection or resumption of a communication session with the electronic device 100, or logging in with an account registered to the electronic device 100.

When the new external device 200-5-th is added, the processor 130 may receive a new encryption key, the individual switching key, an additional individual switching key (or joining separate switching key) generated by the new external device, or the like, through the communicator 110.

The processor 130 may modify the switching key to the additional switching key (or joining switching key (jswk)) based on the individual switching key corresponding to each of the existing external devices and the additional individual switching key. That is, the additional switching key may be a newly updated switching key reflecting the addition state of the new external device.

The processor 130 may perform the key switching operation for the changed plurality of encrypted messages, and re-change each of the changed plurality of encrypted messages to the encrypted message encrypted with a new common key pk' reflecting the new encryption key.

The processor 130 may update each of the various keys such as pk, rlk, rotkey, swk, $swk_i$, or the like to pk', rlk', rotkey', swk', and $swk_i'$ by using the additional switching key.

The processor 130 may also change a newly encrypted message $ENC_{pk5}(m_5)$ to $ENC_{pk'}(m_5)$ when receiving the newly encrypted message $ENC_{pk5}(m_5)$ encrypted with a public key pk5 for a message m5 from the new external device 200-5-th.

The processor 130 may evaluate the changed plurality of encrypted messages with the new common key by using at least one evaluation key.

Figure 5:
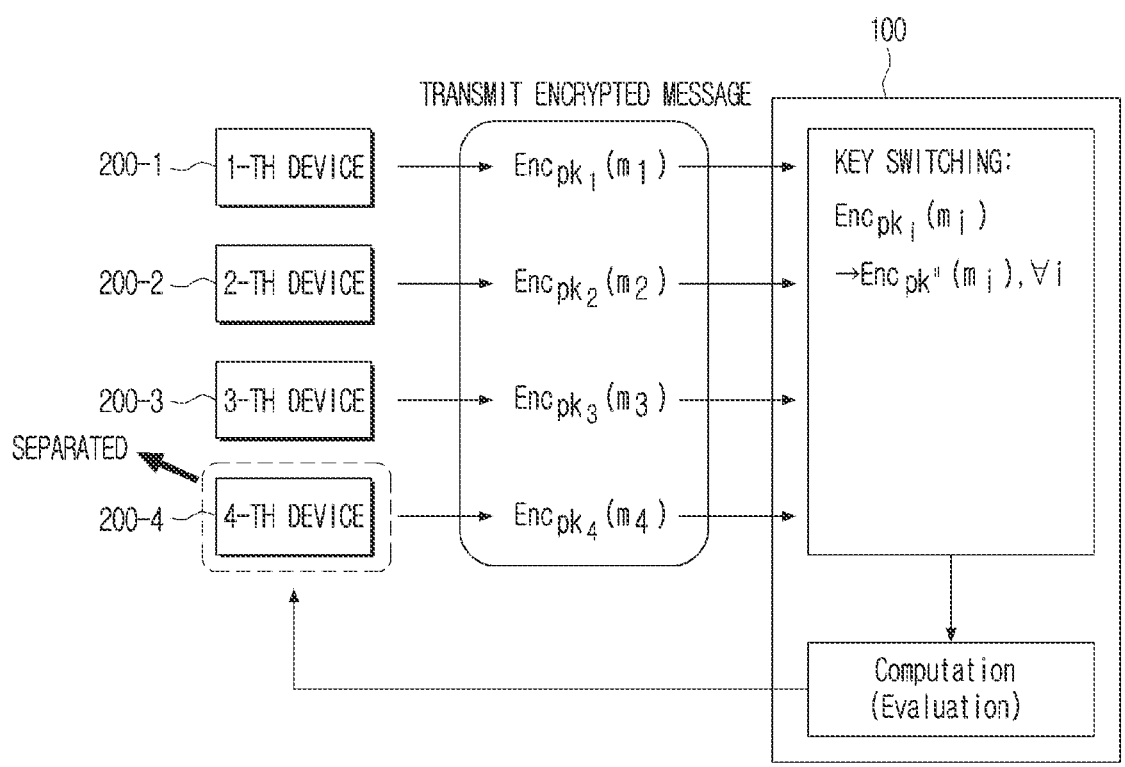
FIG. 5 is a view for explaining an operation of an electronic device when the external device is separated.

FIG. 5 shows a case where one of the existing external devices is separated in the environment of FIG. 3. For convenience of explanation, the separated external device 200-4-th is referred to as the separated external device. In the disclosure, the device separation may refer to a state such as disconnection of the communication session with the electronic device 100 or logging out of the account registered to the electronic device 100.

When one external device 200-4-th is separated, the processor 130 may modify the switching key to a separation switching key (or leaving separate switching key (lswk)) based on a separation individual switching key (or leaving separate switching key) of the separated external device. The separation switching key may be a newly updated switching key reflecting the separation state of the external device.

The processor 130 may perform the key switching operation using the separation switching key for the changed plurality of encrypted messages, and re-change each of the plurality of changed encrypted messages to the encrypted message encrypted with a new common key pk" except for the encryption key of the separated external device.

The processor 130 may update each of the various keys such as pk, rlk, rotkey, swk, $swk_i$, or the like to pk", rlk", rotkey", swk", and $swk_i"$ by using the separation switching key.

The processor 130 may evaluate the re-changed plurality of encrypted messages by using at least one evaluation key.

As shown in FIGS. 4 and 5, the processor 130 may directly store the evaluation result or transmit the same to the various devices.

The description above describes the various methods of performing the evaluation of the encrypted messages of the plurality of devices by the electronic device 100 through the key switching operation.

Hereinafter, the description describes a method or the like of generating various keys used in the various embodiments described above in detail.

Figure 6:
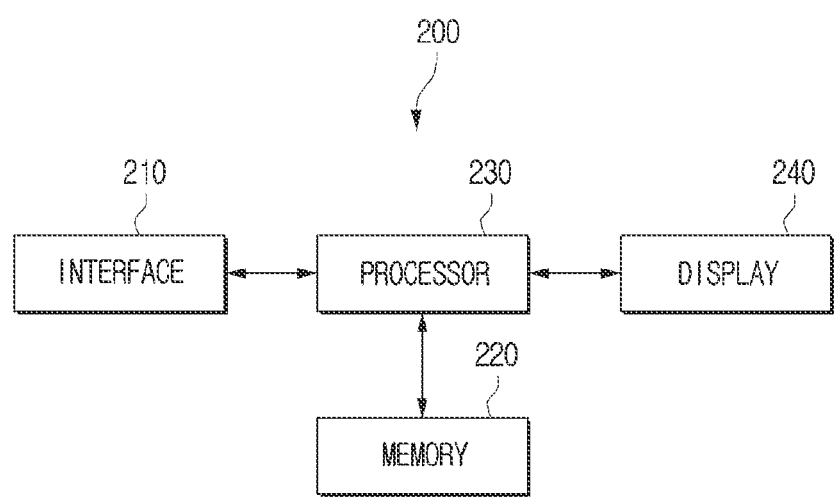
FIG. 6 is a block diagram showing a configuration of the external device according to at least one embodiment of the disclosure.

FIG. 6 is a block diagram showing a configuration of the external device according to at least one embodiment of the disclosure. As described above, the term "external device" is used to refer to a device separately provided outside the electronic device 100, and the external device may thus also be alternatively referred to as an electronic device.

Referring to FIG. 6, the description describes in detail the electronic device with reference numeral 200 added thereto which may be operated as one of the plurality of external devices 200-1-th to 200-n-th of FIG. 1.

The electronic device 200 of FIG. 6 may include an interface 210, a memory 220, a processor 230, and a display 240. The electronic device 200 of FIG. 6 may be implemented in any of various forms such as the personal computer (PC), the laptop PC, the mobile phone, the tablet PC, the kiosk, or the server device. Some examples of each component in FIG. 6 may overlap the examples described in the description provided with reference to FIG. 2, and overlapping descriptions are thus omitted.

The interface 210 may be a component connected to a user, an external memory, the external device, or the like, and receiving various signals, data, control instructions, or the like. The interface 210 may include a communication interface, a manipulation interface, an input/output interface, or the like.

The communication interface may be a component communicating with at least one external device. The communication interface may be implemented to correspond to the communicator described with reference to FIG. 2, and overlapping descriptions are thus omitted.

The manipulation interface may be a component receiving various user manipulation inputs. The manipulation interface may include various buttons, touch screens, or the like, provided on a main body of the electronic device 200. The user may use the manipulation interface to input various data requiring the encryption and input an encryption command and an external transmission command.

The input/output interface may be a component connected to the various external devices through cables, connectors, or the like to input and output the signals. The input/output interface may be connected to the various devices such as an external hard drive, a universal serial bus (USB) storage device, and a mobile device. The input/output interface may be implemented as at least one of a high definition multimedia interface (HDMI), a mobile high-definition link (MHL), a universal serial bus (USB), a USB C-type, a display port (DP), a thunderbolt, a video graphics array (VGA) port, a red-green-blue (RGB) port, a D-subminiature (D-SUB), or a digital visual interface (DVI). The electronic device 200 may also receive various data which requires the encryption or is to be used for the encryption, input from a device connected thereto through the input/output interface.

The memory 220 may be a component storing the various data, signals, programs, or the like.

The processor 230 may perform various control operations based on the various data and the programs, stored in the memory 220. Specific examples of the memory 220 and the processor 230 are described above, and overlapping descriptions are thus omitted.

The display 240 may display various information under control of the processor 230. As an example, the electronic device 200 may be a user device with the check authority for all the evaluation results. In this case, the processor 230 may receive the partially decrypted evaluation result from each of the various external devices 200-1-th to 200-n-th through the interface 210, and partially decrypt the other part by using the secret key stored in the memory 220 to thus acquire all the evaluation results. The processor 230 may control the display 240 to display all the evaluation results. The display 240 may be implemented as a display including a self-light emitting element or a display including a non self-light emitting element and a backlight. For example, the display 240 may be implemented in various types of displays such as a liquid crystal display (LCD), an organic light emitting diode (OLED) display, a light emitting diode (LED) display, a micro light emitting diode (micro LED) display, a mini LED display, a plasma display panel (PDP), a quantum dot (QD) display, a quantum dot light-emitting diode (QLED) display.

As described above, the electronic device 200 may be one of the various external devices described with reference to FIGS. 1 to 5. For example, the electronic device 200 may be one of the external devices 200-1-th to 200-4-th described with reference to FIG. 3 based on a situation, or may be the new external device 200-5-th described with reference to FIG. 4 or the separated external device 200-4-th described with reference to FIG. 5.

Hereinafter, the description describes the operation of the electronic device 200 in detail for each situation.

First, when implemented as one of the external devices 200-1-th to 200-4-th of FIG. 3, the processor 230 may generate the encryption key such as the public key and the secret key.

In detail, the processor 230 may generate the public key by using a ring learning with errors (RLWE) scheme. In detail, the processor 230 may first set various parameters and rings and store the same in the memory 110. An example of the parameter may include the bit length, dimension N or rank k of the plaintext message, and sizes of the public key and the secret key. The homomorphically encrypted message may have various formats, and the processor 230 may set the ring based on a method of the encrypted message based on a method set by the user or a predetermined method. For example, a method of the homomorphically encrypted message may be the Cheon-Kim-Kim-Song (CKKS) scheme, the ring learning with errors (RLWE) scheme, or the like.

The ring may be expressed as the following equation:

$$R = Z_q[X]/f(x). \qquad \text{[Equation 5]}$$

Here, R indicates the ring, Zq indicates a coefficient, and f(x) indicates a N-th polynomial.

The Ring indicates a set of polynomials having predetermined coefficients, and indicates a set in which addition and multiplication are defined between elements and closed for the addition and the multiplication. The Ring may be referred to as a ring.

As an example, the ring indicates a set of the N-th polynomials with the coefficient Zq. In detail, when n is Φ(N), the polynomial indicates a polynomial which may be calculated as the remainder of dividing the polynomial by an N-th cyclotomic polynomial. f(x) indicates ideal of Zq[x] generated by f(x). The Euler totient function Φ(N) indicates the number of natural numbers that are prime to N and smaller than N.

As an example, the ring may be expressed as Equation 3 below:

$$R_{q,N} = Z_q[X_{(N)}]/(X_{(N)}^N + 1). \qquad \text{[Equation 6]}$$

Here, q indicates the modulus, k indicates the rank, and N indicates the dimension. Meanwhile, the above-described ring assumes module-learning with errors (MLWE). Accordingly, N may be used by being replaced with 1 when using a learning with errors (LWE) scheme, and N may be replaced with 1 when using RLWE scheme.

When the ring is set, the processor 230 may calculate the secret key sk from the ring.

$$sk \leftarrow (1, s(x)), s(x) \in R. \qquad \text{[Equation 7]}$$

Here, s(x) indicates a random polynomial generated using a small coefficient.

When the ring and the secret key are selected, the processor 230 may calculate a first random polynomial a(x) from the ring. The first random polynomial may be expressed as follows:

$$a(x) \leftarrow R. \qquad \text{[Equation 8]}$$

In addition, the processor 230 may calculate the error. In detail, the processor 230 may extract the error from a discrete Gaussian distribution or a distribution having a statistical distance close thereto. This error may be expressed as follows:

$$e(x) \leftarrow D_{\alpha q}^n. \qquad \text{[Equation 9]}$$

When the error is calculated, the processor 230 may calculate a second random polynomial by modularly evaluating the error on the first random polynomial and the secret key. The second random polynomial may be expressed as follows:

$$b(x) = -a(x)s(x) + e(x)(\text{mod } q). \qquad \text{[Equation 10]}$$

Finally, the public key pk may be set to include the first random polynomial and the second random polynomial as follows:

$$pk = (a(x), b(x)).$$ [Equation 11]

The method of generating the key described above is only an example, the disclosure is not necessarily limited thereto, and the processor 230 of the electronic device 200 may also generate the public key and the secret key by using another method.

FIG. 7 shows an example of an algorithm for generating the public key. Referring to FIG. 7, the processor 230 may share the common polynomial a, b, $pk_0$, $rotkey_0$, $swk_0$, or the like with other external devices based on the common reference string (CRS) assumption. That is, the processor 230 may acquire a random matrix or random polynomial a by accessing a polynomial set Rx.

The processor 230 may generate the secret key $sk_i$ from a probability distribution $X_{sk}$ of for randomly selecting the secret key $sk_i$, $rsk_i$, or the like. In addition, the processor 230 may randomly extract an error value $e_i$ from an error probability distribution $X_{err}$.

The processor 230 may acquire b which is another random matrix or random polynomial by using the extracted error value and the secret key $s_i$.

As a result, the processor 230 may acquire the public key configured of (a, b).

The algorithm of FIG. 7 may be applied not only to generate the public key but also to generate the rotation key rotKey. The public key and the rotation key rotKey may be generated based on a ring $PQ_L$. In detail, the processor 230 may generate the public key and the rotation key rotKey by using the algorithm of FIG. 7 and the following equation:

$$pk_i \leftarrow \text{PubKeyGen}(PQ_L, pk_0, sk_i, 0)$$ [Equation 12]

$$rotKey_i \leftarrow \text{PubKeyGen}(PQ_L, rotKey_0, sk_i, P \cdot ski^r).$$

In Equation 12, the PubKeyGen indicates the algorithm of FIG. 7.

FIG. 8 shows an example of an algorithm for generating a relinearization key rlk.

In FIG. 8, a or b indicates the polynomial shared by the respective external devices based on the CRS assumption as described above, $rsk_i$ indicates another secret key selected by the processor of the i-th device to generate $rlk_i$, $Ps_i$ indicates $P*sk_i$ (multiply P by the i-th secret key $sk_i$), and $Pr_i$ indicates $P*rsk_i$ (multiply P by the i-th relinearization secret key $rsk_i$).

Referring to FIG. 8, the processor 230 may generate the key based on the common reference string (CRS) assumption. That is, the processor 230 may acquire a and b by accessing a polynomial set $R_{PQ_L}$.

The processor 230 may set the secret keys $sk_i$ and $rsk_i$, which are randomly extracted from the probability distribution $X_{sk}$, to $s_i$ and $r_i$, respectively, and randomly extract error values $e_{0,i}$, $e_{1,i}$, and e2,i from the probability distribution $X_{err}$.

The processor 230 may acquire $rlk_{0,i}$, $rlk_{1,i}$, and $rlk_{2,i}$, respectively, by using the extracted error values, $s_i$ and $r_i$. As a result, the processor 230 may acquire the rotation key $rlk_i = rlk_{0,i}$, $rlk_{1,i}$, $rlk_{2,i}$.

According to the algorithm of FIG. 8, the processor 230 may generate the following relinearization key:

$rlk_i \leftarrow \text{RelinKeyGen}(a, b, sk_i, rsk_i)$.

The description hereinabove describes the method of generating the relinearization key and the rotation key in detail as an example of the evaluation key, and other keys may also be included in the evaluation key. In addition, the method of generating the relinearization key and the rotation key may not necessarily have to be performed in the manner described in the disclosure, and may be modified in various ways.

As described above, the processor 230 of the electronic device 200 may generate the various keys such as the public key, the secret key, the relinear key, and the rotation key.

When the message to be transmitted is input through the interface 210, the processor 230 may generate the encrypted message by reflecting the public key in the input message. In detail, the processor 230 may generate the homomorphically encrypted message by using Equation 13 below:

$$v \cdot pk + (m + e_0, e_1)(\bmod q_L).$$ [Equation 13]

Here, v indicates the selected elements, $e_0$ and $e_1$ indicate the selected error values, and $q_L$ indicates the modulus.

Meanwhile, when implemented, a modified encrypted message may be generated as shown in Equation 14 below:

$$b = -<\vec{a}, \vec{s}> +m + e = (-a_0s_0 + \ldots + -a_{k-1}s_{k-1}) + m + e.$$ [Equation 14]

Here, $\vec{s} = (s_0, \ldots, s_{k-1})$ indicates the secret key, m indicates the message, and e indicates the error.

Meanwhile, the processor 230 may generate the individual switching key and provide the same to the electronic device 100. The electronic device 100 may be a device performing the evaluation for the plurality of encrypted messages.

The individual switching key may be a partial switching key included in the switching key to be used in the key switching operation.

FIG. 9 shows an example of an algorithm for generating the individual switching key.

Referring to FIG. 9, the processor 230 may randomly extract the error values $e_{0,i}$ and $e_{1,i}$ from the value $X_{err}$ within a predetermined range. The processor 230 may generate the individual switching key $swk_i$ based on the public key pk, the secret key $sk_i$, and the error value.

In detail, the processor 230 may acquire its individual switching key $swk_i = (swk_{0,i}, swk_{1,i})$ by generating $swk_{0,i} = pk_0 \cdot r + e_{0,i}$ and $swk_{1,i} = pk_1 \cdot r + P_{si} + e_{1,i}$, respectively. The individual switching key $swk_i$ generated based on this algorithm may be expressed as Equation 3 described above.

As described above, the electronic device 200 corresponding to the external device of FIG. 1 may generate the various keys and the encrypted messages. The electronic device 100 of FIGS. 1 and 2 may receive the other keys except the secret key among the generated keys and the encrypted message, and use the same as described above.

Meanwhile, the processor 230 may receive evaluation result data evaluated by the external device (that is, the electronic device 100 of FIG. 1) through the interface 210. The processor 230 may decrypt the evaluation result data by using the secret key stored in the memory 220. The decryption operation may be performed by a scheme corresponding to the above-described encryption method, the illustration and descriptions of the mathematical equations and algorithms for the decryption are thus omitted.

The decryption by the processor 230 may correspond to the partial decryption. That is, as described above, the electronic device 100 of FIG. 1 may perform the evaluation for the encrypted messages encrypted with the public key, that is, the common key which is a sum of the individual public keys generated by the plurality of external devices 200-1-th to 200-$n$-th. Therefore, all the decryption cannot be performed with the secret key held by one electronic device 200.

The processor 230 may transmit completed data to another device if the partial decryption is completed when the electronic device 200 is not a device with the check authority for all the evaluation results. In this way, all the decryption may be achieved when the partially decrypted data are collected from the respective external devices 200-1-th to 200-$n$-th.

Meanwhile, as described above, the electronic device 200 of FIG. 4 may be a new electronic device. In this case, the processor 230 may perform preparatory work to participate in the homomorphically encrypted message evaluation together with the existing electronic devices.

In detail, the processor 230 may generate various keys as shown in FIG. 10.

Referring to FIG. 10, the processor 230 of the new electronic device may generate the new encryption key (e.g., the public key and the secret key), an individual switching key $swk_{n+1}$, an additional individual switching key $jswk_{n+1}$, or the like. Assuming that there are n existing electronic devices and the new electronic device is an n+i-th participating device, the processor 230 may generate a public key $pk_{n+1}$ and a rotation key $rlk_{n+1}$ among the new encryption keys based on the algorithm described with reference to FIG. 7. In this case, the new common key pk' may be the new public key $pk_{n+1}$ added to the existing common key pk. FIG. 10 shows that the processor 230 of the new electronic device generates the new common key pk'. However, the disclosure is not limited thereto, and the electronic device 100 of FIG. 1, that is, the server device, may generate the new common key pk'.

In addition, the processor 230 may generate the relinearization key $rlk_{n+1}$ among the evaluation keys based on the algorithm described with reference to FIG. 8. In addition, the processor 230 may generate the individual switching key $swk_{n+1}$ based on the algorithm of FIG. 9.

Meanwhile, the processor 230 may generate the additional individual switching key $jswk_{n+1}$. The additional individual switching key $jswk_{n+1}$ may be generated by an algorithm JSWKeyGen for changing the switching key.

FIG. 11 shows an example of the algorithm for generating the additional individual switching key $jswk_{n+1}$.

Referring to FIG. 11, the processor 230 may acquire additional individual switching key $(jswk_{n+1})=(jswk_{0,i}, jswk_{1,i})$ by generate $jswk_{0,i}=0$, and $jswk_{1,i}=-swk_0 \cdot s_i + e_i$, respectively. Here, $s_i$ can be an individual secret key and $e_i$ can be the error value.

The processor 230 may transmit the various keys generated in this way to the electronic device 100 of FIG. 1. When the electronic device 100 of FIG. 1 is implemented as the server device, the server device 100 may modify the switching key to the additional switching key jswk by using the received key.

FIG. 12 is a view showing the key switching operation performed by the processor 130 of the server device 100.

When receiving the additional individual switching key $jswk_{n+1}$, the server device 100 may modify the additional individual switching key $jswk_{n+1}$ to the additional switching key jswk by adding switching keys $\Sigma swk_i$ of the existing electronic devices, that is, adding the additional individual switching key $jswk_{n+1}$ to the existing switching key.

In addition, the server device 100 may acquire an individual encrypted message $ct_{n+1,j}$ by performing the key switching operation using the individual switching key $swk_{n+1}$ for an individual encrypted message $ct_{n+1,j}$ encrypted with the new public key by the new electronic device 200.

Assuming that there are a total of $\ell$ messages before the new electronic device 200 is added, the server device 100 may change the encrypted messages $ct_k$ by performing a key switching operation KS using the additional switching key jswk for all the messages.

The server device 100 may update the rotation key rotKey, the relinear key rlk, and the switching key swk, respectively, by adding an individual rotation key $rotKey_{n+1}$, the individual relinear key $rlk_{n+1}$, and individual switching key swk, transmitted by the new electronic device 200, to the existing the rotation key rotKey, the existing linear key rlk, and the existing the switching key swk, respectively.

FIG. 13 is a view for explaining a method of generating the additional switching key jswk.

Referring to FIG. 13, it may be seen that a final result is $EnC_{sk+skn+1}(P \cdot sk)$ when adding the additional individual switching key $jswk_{n+1}$ of the new electronic device to the existing switching keys $\Sigma swk_i$. As described above, the server device 100 may perform the key switching operation using the additional switching key for the encrypted messages of the existing electronic devices, and re-change each of the encrypted messages to the encrypted message encrypted with the new common key pk' reflecting even the new encryption key (that is, $sk_{n+1}$). In addition to pk, the various keys such as rlk, rotkey, swk, $swk_i$, and the like may also respectively be updated to rlk', rotkey', swk', $swk_i'$, and the like. When also receiving the encrypted message of the new electronic device, the server device 100 may perform the same processing for the corresponding encrypted message.

The server device 100 may evaluate the re-changed plurality of encrypted messages by using at least one evaluation key. The server device 100 may transmit the evaluation result to at least one of the plurality of external devices including the new external device, transmit the same to another device or the like, or directly store the same.

Meanwhile, as described above, the electronic device 200 may be the separated electronic device (or leaving electronic device) of FIG. 5. In this case, the processor 230 may perform the preparatory work for the separation.

FIG. 14 is a view for explaining an operation when the external devices is separated. Assuming that the electronic device 200 of FIG. 6 is an n-th electronic device and is separated from an existing connection structure, as shown in FIG. 14, the processor 230 of the separated electronic device 200 may generate a separation individual switching key lswkn based on a separation switching key generation algorithm LSWKeyGen.

FIG. 15 is a view for explaining an operation of the server device when the external devices is separated. Referring to FIG. 15, the server device 100 may modify the existing switching key to the separation switching key lswk by subtracting the separation individual switching key lswkn from the existing switching keys $\Sigma swk_i$. In addition, the server device 100 may generates the new common key pk"

by subtracting a common key $pk_n$ of the separated electronic device from the common key pk, and also newly modify the rotation key rotKey, the relinearization key rlk, and the switching key in the same way.

The processor 130 of the server device 100 may re-change the encrypted messages by performing the key switching operation using the separation switching key for the encrypted messages encrypted with a previously used common key.

The processor 130 of the server device 100 may evaluate the re-changed plurality of encrypted messages using at least one newly modified evaluation key. The evaluation result may be transmitted to the various devices as described above or stored in the server device 100.

Figure 16:
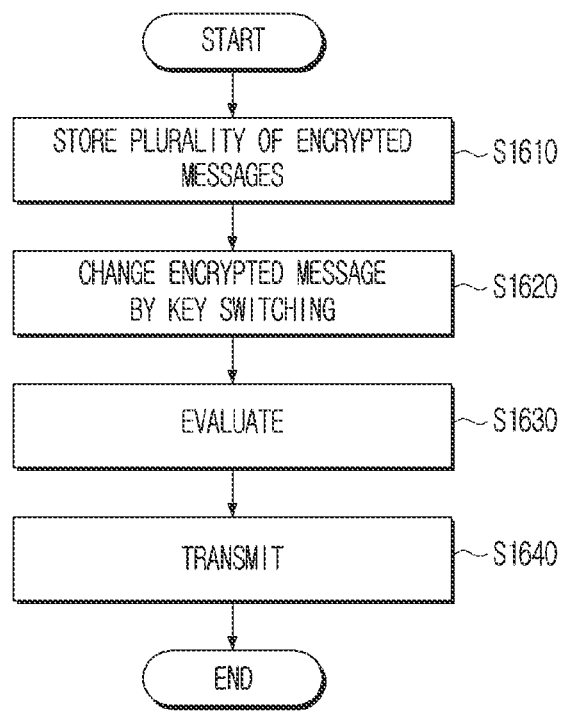
FIG. 16 is a flow chart for explaining an evaluation method according to various embodiments of the disclosure.

FIG. 16 is a flow chart for explaining an evaluation method according to at least one embodiment of the disclosure.

Referring to FIG. 16, a server device may receive a plurality of encrypted messages each encrypted with an encryption key by a plurality of external devices each generating the encryption key and store the same (S1610). The encrypted messages may be sequentially or simultaneously transmitted.

The server device may perform a key switching operation using a switching key for the plurality of encrypted messages to change each of the plurality of encrypted messages to the encrypted message encrypted with a common key (S1620). The key switching operation is described in detail in the above section, and overlapping descriptions are thus omitted.

The server device may evaluate the changed plurality of encrypted messages by using at least one evaluation key (S1630).

The server device may transmit an evaluation result to at least one of the plurality of external devices (S1640). However, the disclosure is not limited thereto, and the server device may transmit the evaluation result to another device or directly store the same.

In this state, when a new external device is added, the server device may receive a new encryption key, an individual switching key, an additional individual switching key (or joining separate switching key), a newly encrypted message, or the like, generated by the new external device.

The server device may modify the switching key to the additional switching key (or joining switching key (JSWK)) based on the individual switching key and the additional individual switching key, corresponding to each of the plurality of external devices. In addition, the server device may re-change each encrypted message to the encrypted message encrypted with the new common key by performing the key switching operation using the additional switching key for the existing changed encrypted messages and the newly encrypted message. As described above, in addition to pk, various keys such as rlk, rotkey, swk, $swk_i$, and the like may also respectively be updated to rlk', rotkey', swk', $swk_i'$, and the like.

The description describes the key switching operation, a common key calculation method, an encrypted message change method, or the like in detail in the above section, and overlapping descriptions are thus omitted.

The server device may perform the evaluation for the re-changed plurality of encrypted messages by using a new evaluation key modified to reflect the new evaluation key generated by the new external device. The server device may directly store the evaluation result or transmit the same to at least one of the plurality of devices including the new external device or another device.

Meanwhile, when at least one of the previously connected external devices is separated, the server device may modify the switching key to a separation switching key (or leaving separate switching key (lswk)) based on a separation individual switching key (or leaving separate switching key) of a separated external device.

The server device may perform the key switching operation using the separation switching key for the changed plurality of encrypted messages to re-change each of the changed plurality of encrypted messages into the encrypted message encrypted with the new common key except for the encryption key of the separated external device. As described above, in addition to pk, the various keys such as rlk, rotkey, swk, $swk_i$, and the like may also respectively be updated to rlk", rotkey", swk", $swk_i''$, and the like.

The server device may perform the evaluation for the re-changed plurality of encrypted messages by using the new evaluation key modified to reflect the separation of the external device, and the evaluation result may be used in various ways as described above.

The evaluation method described with reference to FIG. 16 and the various methods described above may be performed by the electronic device shown in FIG. 2. However, the disclosure is not necessarily limited thereto, and the methods may be performed by other electronic devices having various configurations.

In addition, contents described in the various embodiments described above may be performed by other entities. For example, the common key generation operation, the switching key generation operations, or the like may be performed by each of the external devices 200-1-th to 200-n-th, or may be performed by the server device 100.

According to the various embodiments described above, the plurality of devices may perform the evaluation in the encryption state for the encrypted messages encrypted with the key generated by each of the devices, and the data may be utilized in various ways while maintaining the security. Alternatively, even if a change such as the addition or separation of the device occurs, a burden of unnecessary evaluation may be prevented by dynamically responding thereto.

The encryption method, the key generation method, the evaluation method, or the like, described in the various embodiments described above may be used in various fields.

For example, the respective external devices 200-1-th to 200-n-th of FIG. 1 may be a commercial bank, a securities company, an insurance company, or the like. When requiring statistics on the data held by the respective external devices 200-1-th to 200-n-th, each of the external devices 200-1-th to 200-n-th may generate and encrypt the encryption key as described above, and then transmit the same to the server device 100. The result data evaluated in the manner described above by the server device 100 may be re-provided to the respective external devices 200-1-th to 200-n-th. The result data partially decrypted by each of the respective external devices 200-1-th to 200-n-th by using the secret key held thereby may be provided to the device with the check authority for all the evaluation results (e.g., the Financial Supervisory Service or the National Statistical Office). Accordingly, each device may be utilized in a variety of ways while thoroughly maintaining the security of the data held thereby.

Although the various embodiments have been individually described hereinabove, each embodiment is not necessarily implemented individually, and may also be entirely or partially combined with at least one other embodiment and implemented together in one product.

The various embodiments of the disclosure may be implemented by software including an instruction stored in a machine-readable storage medium (for example, the computer-readable storage medium). A machine may be a device capable of invoking the stored instruction from the storage medium and being operated based on the invoked instruction, and may include the electronic devices 100 and 200 in the disclosed embodiments.

In detail, provided is a non-transitory readable storage medium storing software for sequentially performing changing the plurality of encrypted messages to the encrypted messages encrypted with the common key, and evaluating the changed plurality of encrypted messages using at least one evaluation key by performing the key switching operation using the switching key for the plurality of encrypted messages encrypted with the encryption keys by the plurality of external devices each generating the encryption key.

A device equipped with the non-transitory readable medium may perform the operations such as the evaluation, the key switching, the encryption/decryption, and the key generation described in the various embodiments described above.

Here, a term "non-transitory" in the non-transitory readable storage medium may only indicate that the storage medium is tangible without including a signal, and does not distinguish whether data are semi-permanently or temporarily stored in the storage medium.

Alternatively, a program for performing the method according to the various embodiments described above may be distributed online through an application store. In case of the online distribution, at least a part of the computer program product may be at least temporarily stored or temporarily provided in a storage medium such as a memory of a server of a manufacturer, a server of an application store or a relay server.

Each of components (for example, modules or programs) in the various embodiments may include a single entity or a plurality of entities, and some of the corresponding sub-components described above may be omitted or other sub-components may be further included. Alternatively or additionally, some of the components (e.g., modules or programs) may be integrated into one entity, and may perform functions performed by the respective corresponding components before being integrated in the same or similar manner. Operations performed by the modules, the programs or other components according to the various embodiments may be executed in a sequential manner, a parallel manner, an iterative manner or a heuristic manner, and at least some of the operations may be performed in a different order, may be omitted, or other operations may be added.

Although the disclosure has been described with reference to the accompanying drawings, the scope of the disclosure is determined by the claims described below and should not be construed as being limited to the above-described embodiments or drawings. In addition, it should be clearly understood that improvements, changes, and modifications obvious to those skilled in the art of the disclosure described in the claims are also included in the scope of the disclosure.

What is claimed is:

1. An electronic device comprising:
a communicator communicating with a plurality of external devices each generating an encryption key;
a memory; and
a processor,
wherein the processor stores a plurality of encrypted messages in the memory when receiving the plurality of encrypted messages each encrypted with the encryption key by the plurality of external devices through the communicator,
performs a key switching operation using a switching key for the plurality of encrypted messages to change each of the plurality of encrypted messages to the encrypted message encrypted with a common key,
evaluates the changed plurality of encrypted messages by using at least one evaluation key, and
controls the communicator to transmit an evaluation result to at least one of the plurality of external devices,
wherein the processor receives an individual switching key, an individual relinearization key, and an individual rotation key, generated by each of the plurality of external devices through the communicator, and adds the respective individual switching keys, individual relinearization keys, and individual rotation keys to acquire the switching key, a relinearization key, and a rotation key, and
the at least one evaluation key includes the relinearization key or the rotation key.

2. The device of claim 1, wherein when a new external device is added and a new encryption key, the individual switching key, an additional individual switching key and a newly encrypted message, generated by the new external device, are received through the communicator,
the processor modifies the switching key to an additional switching key based on the individual switching key and the additional individual switching key respectively corresponding to the plurality of external devices,
performs the key switching operation using the additional switching key for the changed plurality of encrypted messages and the newly encrypted message to re-change each of the changed plurality of encrypted messages to the encrypted message encrypted with a new common key reflecting the new encryption key,
performs the evaluation for the re-changed plurality of encrypted messages by using a new evaluation key modified to reflect the new evaluation key generated by the new external device, and
controls the communicator to transmit the evaluation result to at least one of the plurality of external devices including the new external device.

3. An evaluation method of an electronic device, the method comprising:
receiving and storing a plurality of encrypted messages each encrypted with an encryption key by a plurality of external devices each generating the encryption key;
performing a key switching operation using a switching key for the plurality of encrypted messages to change each of the plurality of encrypted messages to the encrypted message encrypted with a common key;
evaluating the changed plurality of encrypted messages by using at least one evaluation key; and
transmitting an evaluation result to at least one of the plurality of external devices,
further comprising:
receiving and storing an individual switching key, an individual relinearization key, and an individual rotation key, generated by each of the plurality of external devices; and
adding the respective individual switching keys, individual relinearization keys, and individual rotation keys to acquire the switching key, a relinearization key, and a rotation key, wherein the at least one evaluation key includes the relinearization key or the rotation key.

4. The method of claim 3, further comprising:

when a new external device is added and a new encryption key, the individual switching key, an additional individual switching key and a newly encrypted message, generated by the new external device, are received, modifying the switching key to an additional switching key based on the individual switching key and the additional individual switching key respectively corresponding to the plurality of external devices;

performing the key switching operation using the additional switching key for the changed plurality of encrypted messages and the newly encrypted message to re-change each of the changed plurality of encrypted messages to the encrypted message encrypted with a new common key reflecting the new encryption key;

performing the evaluation for the re-changed plurality of encrypted messages by using a new evaluation key modified to reflect the new evaluation key generated by the new external device; and transmitting the evaluation result to at least one of the plurality of external devices including the new external device.

5. The method of claim 3, further comprising:

when at least one of the plurality of external devices is separated, modifying the switching key to a separation switching key based on a separation individual switching key of the separated external device;

performing the key operation using the separation switching key for the changed plurality of encrypted messages to re-change each of the changed plurality of encrypted messages to the encrypted message encrypted with a new common key except for the encryption key the separated external device;

performing the evaluation for the re-changed plurality of encrypted messages by using a new evaluation key modified to reflect the separation of the external device; and transmitting the evaluation result to at least one of the other external devices except for the separated external device.

6. An electronic device comprising:

a communicator communicating with a plurality of external devices each generating an encryption key;

a memory; and a processor, wherein the processor stores a plurality of encrypted messages in the memory when receiving the plurality of encrypted messages each encrypted with the encryption key by the plurality of external devices through the communicator, performs a key switching operation using a switching key for the plurality of encrypted messages to change each of the plurality of encrypted messages to the encrypted message encrypted with a common key, evaluates the changed plurality of encrypted messages by using at least one evaluation key, and controls the communicator to transmit an evaluation result to at least one of the plurality of external devices, wherein when at least one of the plurality of external devices is separated, the processor modifies the switching key to a separation switching key based on a separation individual switching key of the separated external device, performs the key switching operation using the separation switching key for the changed plurality of encrypted messages to re-change each of the changed plurality of encrypted messages to the encrypted message encrypted with a new common key except for the encryption key of the separated external device, performs the evaluation for the re-changed plurality of encrypted messages by using a new evaluation key modified to reflect the separation of the external device, and controls the communicator to transmit the evaluation result to at least one of the other external devices except for the separated external device.

* * * * *